(12) United States Patent
Ashworth et al.

(10) Patent No.: US 10,432,332 B2
(45) Date of Patent: Oct. 1, 2019

(54) NARROWBAND SIGNAL DETECTION

(71) Applicant: WILSON ELECTRONICS, LLC, St. George, UT (US)

(72) Inventors: Christopher Ken Ashworth, St. George, UT (US); Patrick Lee Cook, Cedar City, UT (US); Vernon Alan VanBuren, Las Vegas, NV (US)

(73) Assignee: WILSON ELECTRONICS, LLC, St. George, UT (US)

( * ) Notice: Subject to any disclaimer, the term of this patent is extended or adjusted under 35 U.S.C. 154(b) by 0 days.

(21) Appl. No.: 15/724,193

(22) Filed: Oct. 3, 2017

(65) Prior Publication Data
US 2018/0102861 A1   Apr. 12, 2018

Related U.S. Application Data

(60) Provisional application No. 62/405,511, filed on Oct. 7, 2016.

(51) Int. Cl.
*H04B 17/40* (2015.01)
*H04B 7/14* (2006.01)
*H04B 7/155* (2006.01)

(52) U.S. Cl.
CPC ............ *H04B 17/409* (2015.01); *H04B 7/14* (2013.01); *H04B 7/15535* (2013.01)

(58) Field of Classification Search
CPC ............... H04B 7/2606; H04B 7/1555; H04B 7/15578; H04B 10/07953; H04B 10/07955; H04B 7/15535; H04B 17/409; H04B 7/14; H04B 7/15507; H04B 7/15528; H04W 88/04; H04W 16/26; H04W 52/10; H04W 52/52

USPC .......................................................... 455/9
See application file for complete search history.

(56) References Cited

U.S. PATENT DOCUMENTS

| 4,776,032 A | 10/1988 | Odate et al. |
| 5,095,528 A | 3/1992 | Leslie et al. |
| 5,303,395 A | 4/1994 | Dayani |
| 5,737,687 A | 4/1998 | Martin et al. |
| 5,777,530 A | 7/1998 | Nakatuka |

(Continued)

FOREIGN PATENT DOCUMENTS

| EP | 1525678 B1 | 7/2008 |
| GB | 2444308 A | 6/2008 |

(Continued)

OTHER PUBLICATIONS

Graves; "Increasing the Performance and Capacity of Digital Reverse Systems"; A Study of System Performance Using 4:1 bdr Technology; (2008); 32 pages; Cisco Systems Inc.

(Continued)

*Primary Examiner* — Shaima Q Aminzay
(74) *Attorney, Agent, or Firm* — Thorpe North & Western (57) ABSTRACT

Technology for a repeater is disclosed. The repeater can measure a first power level within a passband. The repeater can adjust a gain of the repeater by a selected amount. The repeater can measure a second power level within the passband. The repeater can calculate a difference between the first power level and the second power level. The repeater can determine that the repeater is approaching an oscillation when the difference is different than a selected amount by a predetermined threshold.

17 Claims, 7 Drawing Sheets

(56) References Cited

U.S. PATENT DOCUMENTS

| | | |
|---|---|---|
| 5,835,848 A | 11/1998 | Bi et al. |
| 6,005,884 A | 12/1999 | Cook et al. |
| 6,711,388 B1 | 3/2004 | Neitiniemi |
| 6,889,033 B2 | 5/2005 | Bongfeldt |
| 6,990,313 B1 | 1/2006 | Yarkosky |
| 7,035,587 B1 | 4/2006 | Yarkosky |
| 7,221,967 B2 | 5/2007 | Van Buren et al. |
| 7,974,573 B2 | 7/2011 | Dean |
| 2002/0044594 A1 | 4/2002 | Bongfeldt |
| 2003/0123401 A1 | 7/2003 | Dean |
| 2004/0137854 A1 | 7/2004 | Ge |
| 2004/0146013 A1 | 7/2004 | Song et al. |
| 2004/0156097 A1 | 8/2004 | Roper et al. |
| 2004/0166802 A1 | 8/2004 | McKay, Sr. et al. |
| 2004/0219876 A1 | 11/2004 | Baker et al. |
| 2004/0235417 A1 | 11/2004 | Dean |
| 2005/0118949 A1 | 6/2005 | Allen et al. |
| 2006/0084379 A1 | 4/2006 | O'Neill |
| 2007/0071128 A1 | 3/2007 | Meir et al. |
| 2007/0188235 A1 | 8/2007 | Dean |
| 2008/0081555 A1 | 4/2008 | Kong et al. |
| 2008/0096483 A1 | 4/2008 | Van Buren et al. |
| 2008/0278237 A1 | 11/2008 | Blin |
| 2008/0299898 A1 | 12/2008 | Moon |
| 2011/0151775 A1 | 6/2011 | Kang et al. |
| 2013/0203403 A1* | 8/2013 | Cook .................. H04W 24/02 455/423 |

FOREIGN PATENT DOCUMENTS

| | | |
|---|---|---|
| JP | 2006/115149 A | 4/2006 |
| KR | 10-2011/0022191 A | 3/2011 |
| WO | WO00/46929 | 8/2000 |
| WO | WO 02/098014 A3 | 12/2002 |
| WO | WO03013028 A1 | 2/2003 |

OTHER PUBLICATIONS

Olabiyi et al.; "Extending the Capability of Energy Detector for Sensing of Heterogeneous Wideband Spectrum." Consumer Communications and Networking Conference; IEEE; Jan. 14-17, 2012; vol. 4, Issue 3; 19 Pages.

PCT Application No. PCT/US2017/054996, Filing Date Oct. 3, 2017, Christopher Ken Ashworth, International Search Report, Mailing Date Jan. 30, 2018, 12 Pages.

Wakai.; "Narrow-Band Surge Protector for Medium-Wave Transmitter with Comprehensive Monitoring System." Instrumentation and Measurement Technology Conference. Instrumentation and Measurement Technology Conference; IEEE; May 5-7, 2009; pp. 181-186.

3GPP2 C.S0011-B; "Recommended Minimum Performance Standards for cdma2000® Spread Spectrum Mobile Stations"; TIA-98-E; (Dec. 13, 2002); 448 pages; Release B, Version 1, Revision E.

ADL5513; "1 MHz to 4 GHz, 80 dB Logarithmic Detector / Controller"; Data Sheet; (2008); 25 pages.

HMC713LP3E; "54 dB, Logarithmic Detector / Controller, 50-8000 MHz"; Data Sheet; (2010); 12 pages.

HMC909LP4E; "RMS Power Detector Single-Ended, DC -5.8 GHz"; Data Sheet; (2010); 21 pages.

PIC16F873; "28/40-Pin 8-Bit CMOS Flash Microcontrollers"; Data Sheet; (2001); 218 pages.

\* cited by examiner

NARROWBAND SIGNAL DETECTION

RELATED APPLICATIONS

The present application claims priority to U.S. Provisional Patent Application No. 62/405,511, filed Oct. 7, 2016, the entire specification of which is hereby incorporated by reference in its entirety for all purposes.

BACKGROUND

Signal boosters and repeaters can be used to increase the quality of wireless communication between a wireless device and a wireless communication access point, such as a cell tower. Signal boosters can improve the quality of the wireless communication by amplifying, filtering, and/or applying other processing techniques to uplink and downlink signals communicated between the wireless device and the wireless communication access point.

As an example, the signal booster can receive, via an antenna, downlink signals from the wireless communication access point. The signal booster can amplify the downlink signal and then provide an amplified downlink signal to the wireless device. In other words, the signal booster can act as a relay between the wireless device and the wireless communication access point. As a result, the wireless device can receive a stronger signal from the wireless communication access point. Similarly, uplink signals from the wireless device (e.g., telephone calls and other data) can be directed to the signal booster. The signal booster can amplify the uplink signals before communicating, via an antenna, the uplink signals to the wireless communication access point.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Figure 1:
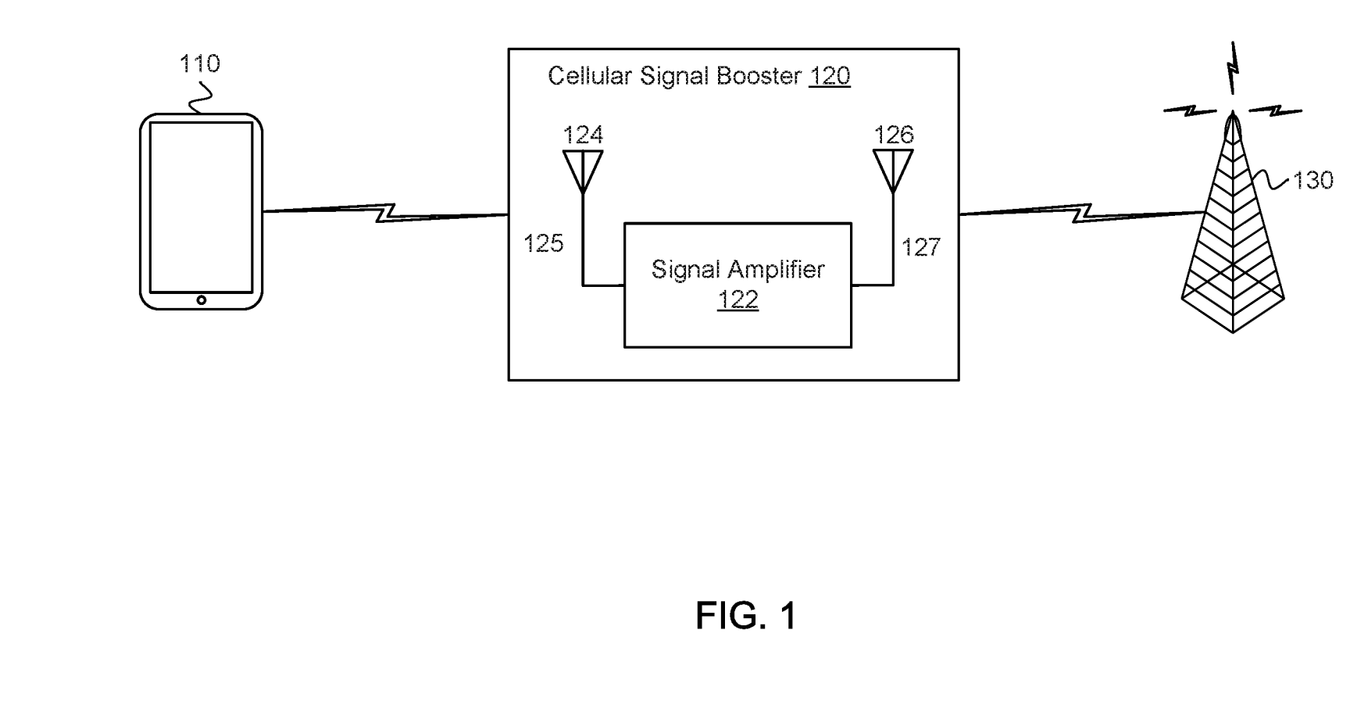
FIG. 1 illustrates a signal booster in communication with a wireless device and a base station in accordance with an example.

FIG. 1 illustrates an exemplary signal booster 120 in communication with a wireless device 110 and a base station 130. The signal booster 120 can be referred to as a repeater. A repeater can be an electronic device used to amplify (or boost) signals. The signal booster 120 (also referred to as a cellular signal amplifier) can improve the quality of wireless communication by amplifying, filtering, and/or applying other processing techniques via a signal amplifier 122 to uplink signals communicated from the wireless device 110 to the base station 130 and/or downlink signals communicated from the base station 130 to the wireless device 110. In other words, the signal booster 120 can amplify or boost uplink signals and/or downlink signals bi-directionally. In one example, the signal booster 120 can be at a fixed location, such as in a home or office. Alternatively, the signal booster 120 can be attached to a mobile object, such as a vehicle or a wireless device 110.

In one configuration, the signal booster 120 can include an integrated device antenna 124 (e.g., an inside antenna or a coupling antenna) and an integrated node antenna 126 (e.g., an outside antenna). The integrated node antenna 126 can receive the downlink signal from the base station 130. The downlink signal can be provided to the signal amplifier 122 via a second coaxial cable 127 or other type of radio frequency connection operable to communicate radio frequency signals. The signal amplifier 122 can include one or more cellular signal amplifiers for amplification and filtering. The downlink signal that has been amplified and filtered can be provided to the integrated device antenna 124 via a first coaxial cable 125 or other type of radio frequency connection operable to communicate radio frequency signals. The integrated device antenna 124 can wirelessly communicate the downlink signal that has been amplified and filtered to the wireless device 110.

Similarly, the integrated device antenna 124 can receive an uplink signal from the wireless device 110. The uplink signal can be provided to the signal amplifier 122 via the first coaxial cable 125 or other type of radio frequency connection operable to communicate radio frequency signals. The signal amplifier 122 can include one or more cellular signal amplifiers for amplification and filtering. The uplink signal that has been amplified and filtered can be provided to the integrated node antenna 126 via the second coaxial cable 127 or other type of radio frequency connection operable to communicate radio frequency signals. The integrated node antenna 126 can communicate the uplink signal that has been amplified and filtered to the base station 130.

In one example, the signal booster 120 can filter the uplink and downlink signals using any suitable analog or digital filtering technology including, but not limited to, surface acoustic wave (SAW) filters, bulk acoustic wave (BAW) filters, film bulk acoustic resonator (FBAR) filters, ceramic filters, waveguide filters or low-temperature co-fired ceramic (LTCC) filters.

In one example, the signal booster 120 can send uplink signals to a node and/or receive downlink signals from the node. The node can comprise a wireless wide area network (WWAN) access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or another type of WWAN access point.

In one configuration, the signal booster 120 used to amplify the uplink and/or a downlink signal is a handheld booster. The handheld booster can be implemented in a sleeve of the wireless device 110. The wireless device sleeve can be attached to the wireless device 110, but can be removed as needed. In this configuration, the signal booster 120 can automatically power down or cease amplification when the wireless device 110 approaches a particular base station. In other words, the signal booster 120 can determine to stop performing signal amplification when the quality of uplink and/or downlink signals is above a defined threshold based on a location of the wireless device 110 in relation to the base station 130.

In one example, the signal booster 120 can include a battery to provide power to various components, such as the signal amplifier 122, the integrated device antenna 124 and the integrated node antenna 126. The battery can also power the wireless device 110 (e.g., phone or tablet). Alternatively, the signal booster 120 can receive power from the wireless device 110.

In one configuration, the signal booster 120 can be a Federal Communications Commission (FCC)-compatible consumer signal booster. As a non-limiting example, the signal booster 120 can be compatible with FCC Part 20 or 47 Code of Federal Regulations (C.F.R.) Part 20.21 (Mar. 21, 2013). In addition, the signal booster 120 can operate on the frequencies used for the provision of subscriber-based services under parts 22 (Cellular), 24 (Broadband PCS), 27 (AWS-1, 700 MHz Lower A-E Blocks, and 700 MHz Upper C Block), and 90 (Specialized Mobile Radio) of 47 C.F.R. The signal booster 120 can be configured to automatically self-monitor its operation to ensure compliance with applicable noise and gain limits. The signal booster 120 can either self-correct or shut down automatically if the signal booster's operations violate the regulations defined in FCC Part 20.21.

In one configuration, the signal booster 120 can improve the wireless connection between the wireless device 110 and the base station 130 (e.g., cell tower) or another type of wireless wide area network (WWAN) access point (AP). The signal booster 120 can boost signals for cellular standards, such as the Third Generation Partnership Project (3GPP) Long Term Evolution (LTE) Release 8, 9, 10, 11, 12, or 13 standards or Institute of Electronics and Electrical Engineers (IEEE) 802.16. In one configuration, the signal booster 120 can boost signals for 3GPP LTE Release 13.0.0 (March 2016) or other desired releases. The signal booster 120 can boost signals from the 3GPP Technical Specification 36.101 (Release 12 Jun. 2015) bands or LTE frequency bands. For example, the signal booster 120 can boost signals from the LTE frequency bands: 2, 4, 5, 12, 13, 17, and 25. In addition, the signal booster 120 can boost selected frequency bands based on the country or region in which the signal booster is used, including any of bands 1-70 or other bands, as disclosed in ETSI TS136 104 V13.5.0 (2016-10).

The number of LTE frequency bands and the level of signal improvement can vary based on a particular wireless device, cellular node, or location. Additional domestic and international frequencies can also be included to offer increased functionality. Selected models of the signal booster 120 can be configured to operate with selected frequency bands based on the location of use. In another example, the signal booster 120 can automatically sense from the wireless device 110 or base station 130 (or GPS, etc.) which frequencies are used, which can be a benefit for international travelers.

In one example, the integrated device antenna 124 and the integrated node antenna 126 can be comprised of a single antenna, an antenna array, or have a telescoping form-factor. In another example, the integrated device antenna 124 and the integrated node antenna 126 can be a microchip antenna. An example of a microchip antenna is AMMAL001. In yet another example, the integrated device antenna 124 and the integrated node antenna 126 can be a printed circuit board (PCB) antenna. An example of a PCB antenna is TE 2118310-1.

In one example, the integrated device antenna 124 can receive uplink (UL) signals from the wireless device 100 and transmit DL signals to the wireless device 100 using a single antenna. Alternatively, the integrated device antenna 124 can receive UL signals from the wireless device 100 using a dedicated UL antenna, and the integrated device antenna 124 can transmit DL signals to the wireless device 100 using a dedicated DL antenna.

In one example, the integrated device antenna 124 can communicate with the wireless device 110 using near field communication. Alternatively, the integrated device antenna 124 can communicate with the wireless device 110 using far field communication.

In one example, the integrated node antenna 126 can receive downlink (DL) signals from the base station 130 and transmit uplink (UL) signals to the base station 130 via a single antenna. Alternatively, the integrated node antenna 126 can receive DL signals from the base station 130 using a dedicated DL antenna, and the integrated node antenna 126 can transmit UL signals to the base station 130 using a dedicated UL antenna.

In one configuration, multiple signal boosters can be used to amplify UL and DL signals. For example, a first signal booster can be used to amplify UL signals and a second signal booster can be used to amplify DL signals. In addition, different signal boosters can be used to amplify different frequency ranges.

In one configuration, the signal booster 120 can be configured to identify when the wireless device 110 receives a relatively strong downlink signal. An example of a strong downlink signal can be a downlink signal with a signal strength greater than approximately −80 dBm. The signal booster 120 can be configured to automatically turn off selected features, such as amplification, to conserve battery life. When the signal booster 120 senses that the wireless device 110 is receiving a relatively weak downlink signal, the integrated booster can be configured to provide amplification of the downlink signal. An example of a weak downlink signal can be a downlink signal with a signal strength less than −80 dBm.

In one example, the signal booster 120 can also include one or more of: a waterproof casing, a shock absorbent casing, a flip-cover, a wallet, or extra memory storage for the wireless device. In one example, extra memory storage can be achieved with a direct connection between the signal booster 120 and the wireless device 110. In another example, Near-Field Communications (NFC), Bluetooth v4.0, Bluetooth Low Energy, Bluetooth v4.1, Bluetooth v4.2, Bluetooth 5, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, or IEEE 802.11ad can be used to couple the signal booster 120 with the wireless device 110 to enable data from the wireless device 110 to be communicated to and stored in the extra memory storage that is integrated in the signal booster 120. Alternatively, a connector can be used to connect the wireless device 110 to the extra memory storage.

In one example, the signal booster 120 can include photovoltaic cells or solar panels as a technique of charging the integrated battery and/or a battery of the wireless device 110. In another example, the signal booster 120 can be configured to communicate directly with other wireless devices with signal boosters. In one example, the integrated node antenna 126 can communicate over Very High Frequency (VHF) communications directly with integrated node antennas of other signal boosters. The signal booster 120 can be configured to communicate with the wireless device 110 through a direct connection, Near-Field Communications (NFC), Bluetooth v4.0, Bluetooth Low Energy, Bluetooth v4.1, Bluetooth v4.2, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, a TV White Space Band (TVWS), or any other industrial, scientific and medical (ISM) radio band. Examples of such ISM bands include 2.4 GHz, 3.6 GHz, 4.9 GHz, 5 GHz, or 5.9 GHz. This configuration can allow data to pass at high rates between multiple wireless devices with signal boosters. This configuration can also allow users to send text messages, initiate phone calls, and engage in video communications between wireless devices with signal boosters. In one example, the integrated node antenna 126 can be configured to couple to the wireless device 110. In other words, communications between the integrated node antenna 126 and the wireless device 110 can bypass the integrated booster.

In another example, a separate VHF node antenna can be configured to communicate over VHF communications directly with separate VHF node antennas of other signal boosters. This configuration can allow the integrated node antenna 126 to be used for simultaneous cellular communications. The separate VHF node antenna can be configured to communicate with the wireless device 110 through a direct connection, Near-Field Communications (NFC), Bluetooth v4.0, Bluetooth Low Energy, Bluetooth v4.1, Bluetooth v4.2, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, a TV White Space Band (TVWS), or any other industrial, scientific and medical (ISM) radio band.

In one configuration, the signal booster 120 can be configured for satellite communication. In one example, the integrated node antenna 126 can be configured to act as a satellite communication antenna. In another example, a separate node antenna can be used for satellite communications. The signal booster 120 can extend the range of coverage of the wireless device 110 configured for satellite communication. The integrated node antenna 126 can receive downlink signals from satellite communications for the wireless device 110. The signal booster 120 can filter and amplify the downlink signals from the satellite communication. In another example, during satellite communications, the wireless device 110 can be configured to couple to the signal booster 120 via a direct connection or an ISM radio band. Examples of such ISM bands include 2.4 GHz, 3.6 GHz, 4.9 GHz, 5 GHz, or 5.9 GHz.

Figure 2:
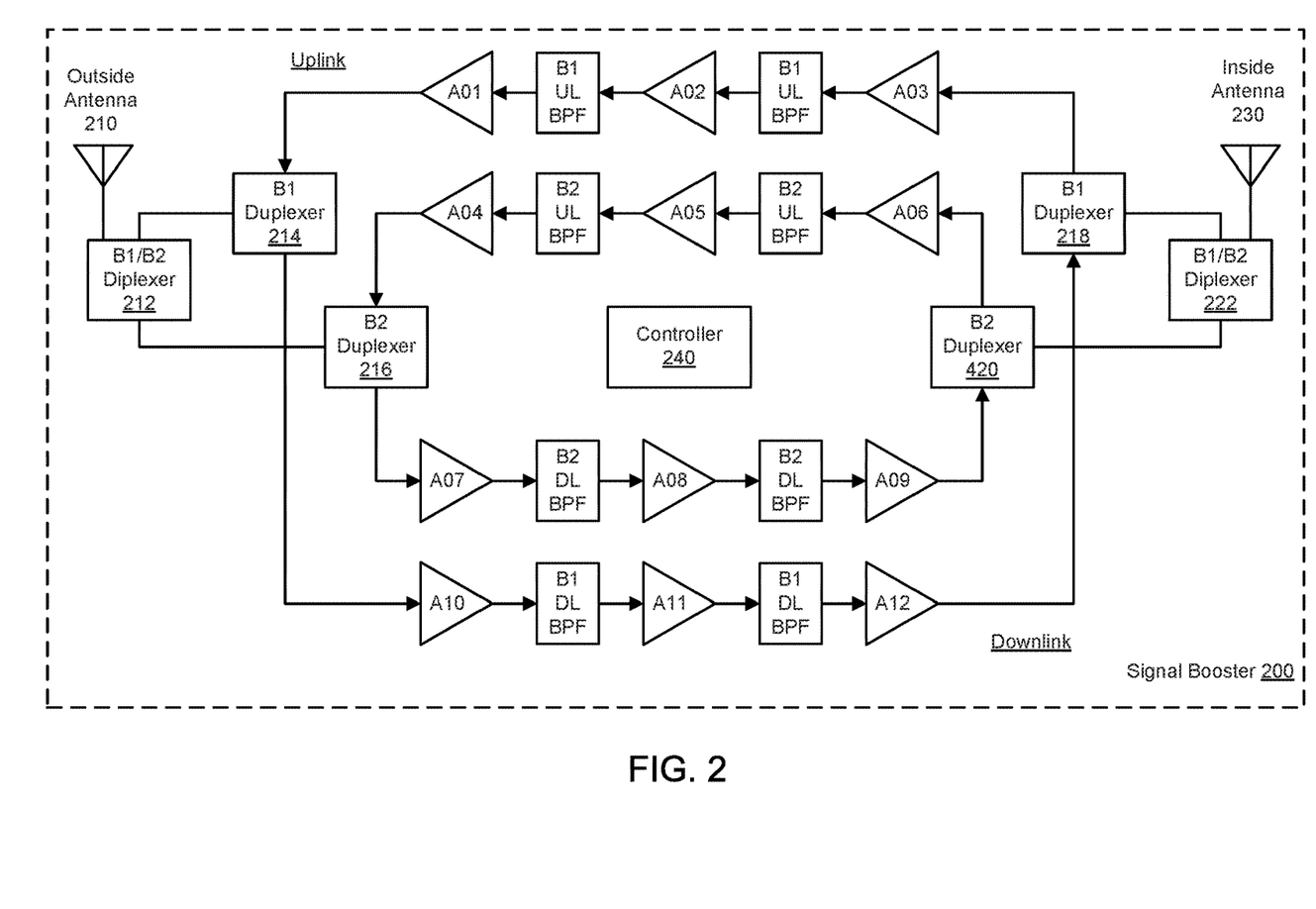
FIG. 2 illustrates a cellular signal booster configured to amplify uplink (UL) and downlink (DL) signals using one or more downlink signal paths and one or more uplink signal paths in accordance with an example.

FIG. 2 illustrates an exemplary bi-directional wireless signal booster 200 configured to amplify uplink (UL) and downlink (DL) signals using a separate signal path for each UL frequency band and DL frequency band and a controller 240. The bi-directional wireless signal booster 200 can be integrated with a GPS module in a signal booster. An outside antenna 210, or an integrated node antenna, can receive a downlink signal. For example, the downlink signal can be received from a base station (not shown). The downlink signal can be provided to a first B1/B2 diplexer 212, wherein B1 represents a first frequency band and B2 represents a second frequency band. The first B1/B2 diplexer 212 can create a B1 downlink signal path and a B2 downlink signal path. Therefore, a downlink signal that is associated with B1 can travel along the B1 downlink signal path to a first B1 duplexer 214, or a downlink signal that is associated with B2 can travel along the B2 downlink signal path to a first B2 duplexer 216. After passing the first B1 duplexer 214, the downlink signal can travel through a series of amplifiers (e.g., A10, A11 and A12) and downlink band pass filters (BPF) to a second B1 duplexer 218. Alternatively, after passing the first B2 duplexer 216, the downlink can travel through a series of amplifiers (e.g., A07, A08 and A09) and downlink band pass filters (BFF) to a second B2 duplexer 220. At this point, the downlink signal (B1 or B2) has been amplified and filtered in accordance with the type of amplifiers and BPFs included in the bi-directional wireless signal booster 200. The downlink signals from the second B1 duplexer 218 or the second B2 duplexer 220, respectively, can be provided to a second B1/B2 diplexer 222. The second B1/B2 diplexer 222 can provide an amplified downlink signal to an inside antenna 230, or an integrated device antenna. The inside antenna 230 can communicate the amplified downlink signal to a wireless device (not shown), such as a mobile phone.

In one example, the inside antenna 230 can receive an uplink (UL) signal from the wireless device. The uplink signal can be provided to the second B1/B2 diplexer 222. The second B1/B2 diplexer 222 can create a B1 uplink signal path and a B2 uplink signal path. Therefore, an uplink signal that is associated with B1 can travel along the B1 uplink signal path to the second B1 duplexer 218, or an uplink signal that is associated with B2 can travel along the B2 uplink signal path to the second B2 duplexer 222. After passing the second B1 duplexer 218, the uplink signal can travel through a series of amplifiers (e.g., A01, A02 and A03) and uplink band pass filters (BPF) to the first B1 duplexer 214. Alternatively, after passing the second B2 duplexer 220, the uplink signal can travel through a series of amplifiers (e.g., A04, A05 and A06) and uplink band pass filters (BPF) to the first B2 duplexer 216. At this point, the uplink signal (B1 or B2) has been amplified and filtered in accordance with the type of amplifiers and BFFs included in the bi-directional wireless signal booster 200. The uplink signals from the first B1 duplexer 214 or the first B2 duplexer 216, respectively, can be provided to the first B1/B2 diplexer 12. The first B1/B2 diplexer 212 can provide an amplified uplink signal to the outside antenna 210. The outside antenna can communicate the amplified uplink signal to the base station.

In one example, the bi-directional wireless signal booster 200 can be a 6-band booster. In other words, the bi-directional wireless signal booster 200 can perform amplification and filtering for downlink and uplink signals having a frequency in bands B1, B2, B3 B4, B5 and/or B6.

In one example, the bi-directional wireless signal booster 200 can use the duplexers to separate the uplink and downlink frequency bands, which are then amplified and filtered separately. A multiple-band cellular signal booster can typically have dedicated radio frequency (RF) amplifiers (gain blocks), RF detectors, variable RF attenuators and RF filters for each uplink and downlink band.

Figure 3:
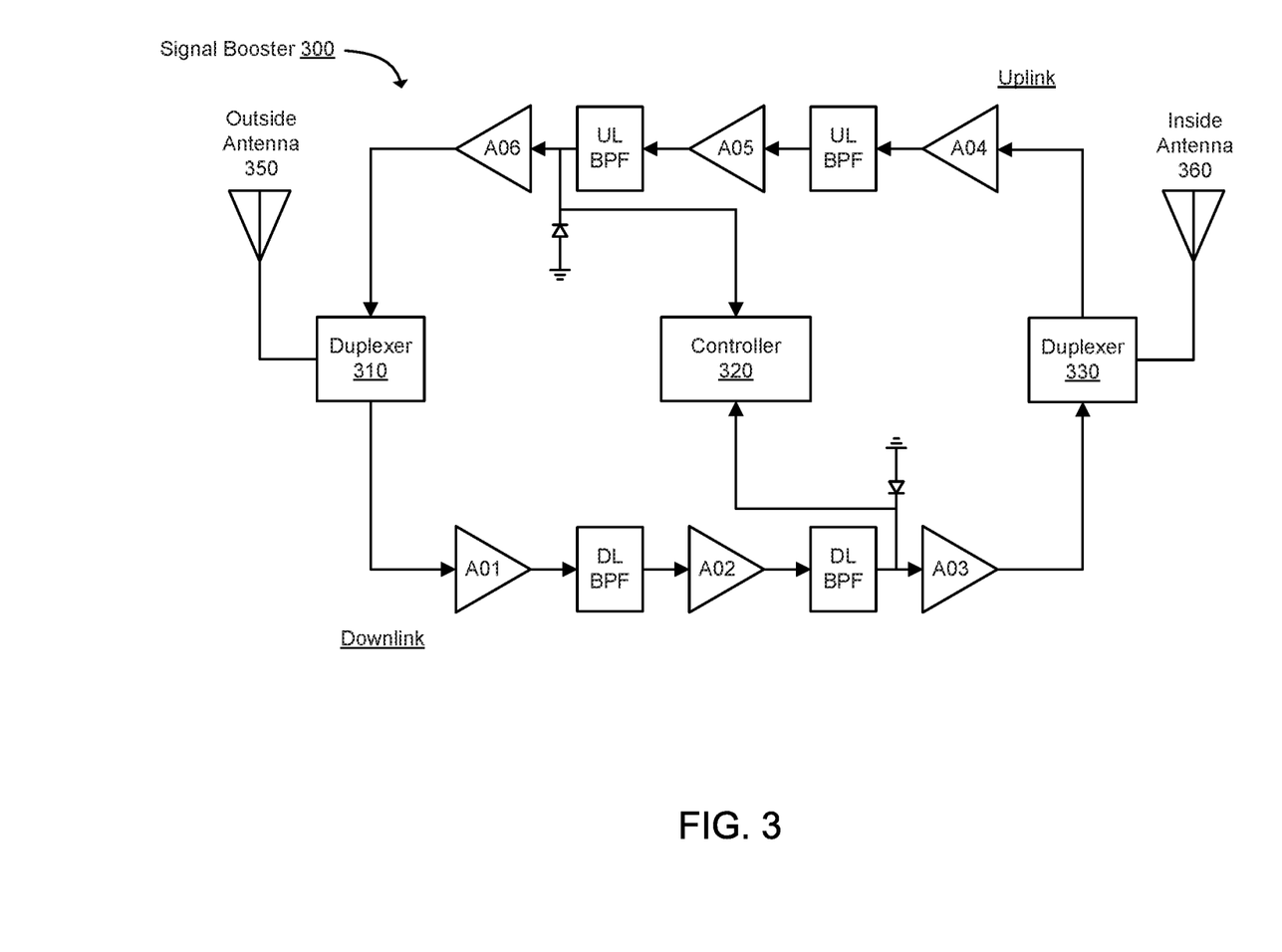
FIG. 3 illustrates a signal booster that includes a broadband signal detector in accordance with an example.

FIG. 3 illustrates an example of a bi-directional broadband signal booster 300. The bi-directional broadband signal booster 300 can utilize multiple radio frequency (RF) detectors for the uplink and downlink bands. The bi-directional broadband signal booster 300 can have an RF detector on each uplink and downlink band since the signal booster can be operating on all bands. The RF detector can be a diode. Alternatively, the RF detector can be a log-detector integrated circuit (IC), which can be used to obtain an increased detection range. A log detector can convert a composite power at its RF input and convert the power to a proportional direct current (DC) voltage. The log detector can be utilized for functions such as automatic gain control, oscillation detection, and other network protection standards.

In one example, bandpass filters (BPF) can have a defined passband, which can be measured in megahertz (MHz). For example, a band 25 (B25) uplink passband is 1850-1915 MHz and a band 25 (B25) downlink passband is 1930-1995 MHz. Signals on frequencies within that passband can pass through while signals on frequencies outside of that passband can be attenuated. A log-detector after a BPF will convert a composite signal power in the filter's entire passband to a DC voltage.

In one example, the bi-directional broadband signal booster 300 can include an outside antenna 350 coupled to a first duplexer 310, and an inside antenna 360 coupled to a second duplexer 330. The bi-directional broadband signal booster 300 can include a downlink path, which can include a series of amplifiers and downlink band pass filters. Similarly, the bi-directional broadband signal booster 300 can include an uplink path, which can include a series of amplifiers and uplink band pass filters. In addition, the bi-directional broadband signal booster 300 can include a controller 320 that is coupled to the RF detector(s) in the uplink path and the downlink path.

Some network protection standards, such as the FCC Consumer Booster Standard, include rules for determining whether a signal booster is oscillating. An oscillation can be created when outside and inside antennas that are internally located in the signal booster are within a defined distance from each other, such that a level of booster amplification is greater than a path loss between the antennas and a positive feedback loop exists. With signal boosters, two antennas that are within a defined distance from each other can produce an RF squeal.

From an installation perspective, a customer may install signal booster antennas relatively close to each other (e.g., due to constraints in a home), but a greater gain of the signal booster requires that the antennas be installed further away from each other. When antennas are installed relatively close to each other, an oscillation can occur in either a downlink path or an uplink path.

In one example, oscillations can be caused due to feedback or noise, which can be amplified in the signal booster over a period of time. Since the signal booster can include both an uplink path and a downlink path, there is a loop that has the potential to cause internal oscillations. For example, in a feedback path from one antenna to another antenna, one antenna can transmit to the other antenna. An oscillation can occur when a loss between antennas is less than a gain in the signal booster. An oscillation may not occur when a loss between the antennas is greater than a gain in the signal booster. In addition, an oscillation can occur when an output port of the signal booster couples back to an input port of the signal booster due to poor shielding.

In one example, the signal booster can include an external antenna, an amplifier, an internal antenna and cabling that connects the external antenna, the amplifier, and the internal antenna. The external antenna can receive a signal outside a building and transmit the signal to the amplifier. The amplifier can boost the signal and then send an amplified signal to the internal antenna. The internal antenna can broadcast the amplified signal to an area with poor signal coverage. An oscillation can occur when a broadcasted signal from the internal antennas is detected by the external antenna, and the broadcasted signal is passed through the signal booster again, which can result in a background noise. This noise can result in poor reception on the device being used. In some cases, the signal booster can automatically reduce their capabilities or shut down when an oscillation or feedback begins to occur.

In one example, the FCC Consumer Booster Standard dictates that a signal booster is required to restart after an occurrence of a defined number of oscillations (e.g., 5 oscillations). In this example, after 5 oscillations, a user can shut off the signal booster and manually recycle the power to reset the signal booster. Due to the limitation of restarting the signal booster after the defined number of signal oscillations, after a single oscillation, the signal booster can be shut off or a gain can be reduced. The gain can be reduced to avoid oscillating again when the signal booster is turned back on. As an example, for a 70 decibel (dB) gain signal booster, the gain can be backed off to 66 dB or 68 dB. If there are no more oscillations, the signal booster can operate indefinitely at this reduced gain. The signal booster can continue to operate using the same reduced gain because there is significant risk in increasing the gain, which can later result in another oscillation. Although conditions can change at a later time (e.g., the antennas can be moved which results in a decrease in noise) and the signal booster is potentially able to revert back to the 70 dB gain, current solutions are not capable of detecting such condition changes.

In the present technology, a more passive technique for oscillation detection is described that does not involve the actual occurrence of an oscillation. In other words, a potential or approaching oscillation can be detected before the oscillation occurs, as opposed to detecting the oscillation only after the oscillation occurs. By detecting a potential oscillation or when an oscillation is approaching, the network can be better protected because actions can be taken that prevent the oscillation from actually occurring.

In the present technology, an oscillation margin can be measured without actually instigating an oscillation. When an approaching oscillation is detected, certain actions can be performed (e.g., a gain can be reduced). The reduction of the gain can function to mitigate the approaching oscillation (i.e., prevents the oscillation from occurring). When no approaching oscillation is detected, certain actions can be performed (e.g., a gain can be increased). In one example, a level of gain can initially begin at a default level, and the gain can be slowly increased over time until an approaching oscillation is detected, at which point the gain can be reduced. One benefit with this technique is that an optimum gain can be determined without actually creating an oscillation. By not causing an actual oscillation, the signal booster may not shut off due to the number of oscillations reaching a predetermined value (e.g., 5 oscillations).

Another benefit is that the gain can be adjusted up or down based on the oscillation margin. In previous solutions, the booster gain is only reduced when an oscillation is detected, and no attempts are made to increase the booster gain at a later time for fear of another oscillation occurring. However, there are advantages to increasing the gain when conditions change for the signal booster, and such advantages are not achieved in previous solutions.

Furthermore, in previous solutions, an oscillation can only be detected after the oscillation occurs. For example, an oscillation can be detected, and then the gain can be reduced by a predetermined amount (e.g., 5 dB). However, in previous solutions, there is no mechanism to detect an approaching oscillation and then perform specific actions (e.g., reducing the gain by a predetermined amount) to avoid an actual occurrence of the oscillation. In other words, in previous solutions, the oscillations are detected in an active manner (i.e., after the oscillation occurs), as opposed to a passive manner (i.e., before the oscillation occurs).

In one configuration, as the two antennas in the signal booster become closer to each other, a noise floor of the signal booster can begin to rise. In other words, as an oscillation is approaching, the noise floor can begin to increase and feedback paths start to develop. The feedback paths can start weak at first, but become stronger when the oscillation becomes full blown. The noise floor can start to rise on certain frequencies. The noise floor increases can be periodic until the oscillation is full blown, at which point the noise floor increases can affect one specific frequency.

As described in further detail below, in the present technology, noise floor increases (e.g., periodic noise floor increases) can be detected before the oscillation occurs. By detecting the noise floor increases, a potential or approaching oscillation can be detected, and certain actions can be performed to mitigate an occurrence of the oscillation (i.e., to prevent the oscillation from actually occurring). In one example, the ability to detect approaching oscillations can be implemented in broadband boosters to better protect the network.

In one example, in the present technology, the detection of the noise floor increases can result in the detection of both internal oscillations and external oscillations. The external oscillations can occur between antennas of the signal booster. The internal oscillations can occur when the signal booster itself is oscillating. For example, the signal booster can internally oscillate or approach an oscillation when a filter degrades, a signal booster design is faulty, etc.

Figure 4:
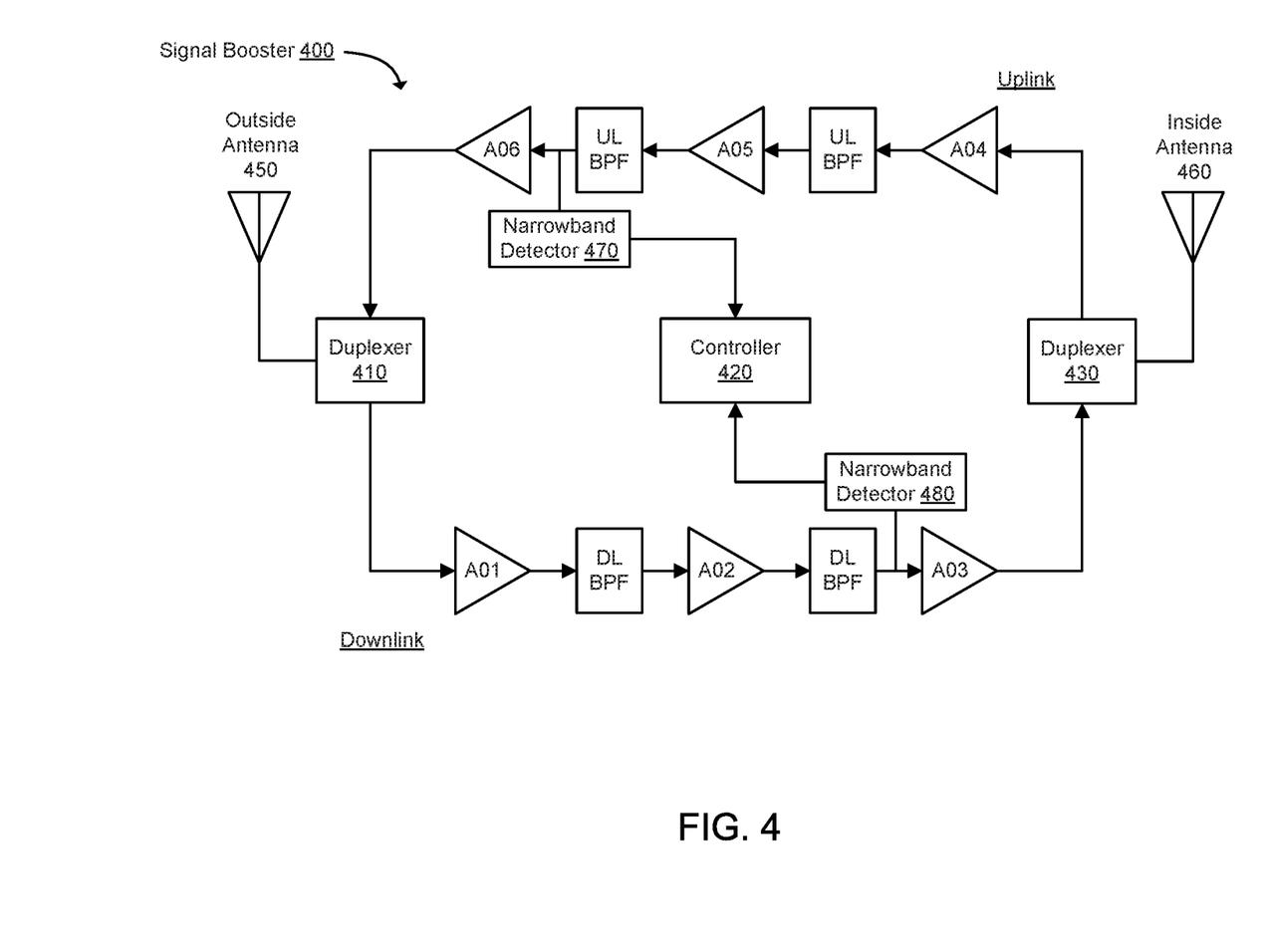
FIG. 4 illustrates a signal booster that includes a narrowband signal detector in accordance with an example.

FIG. 4 illustrates an example of a bi-directional narrowband signal booster 400. The bi-directional narrowband signal booster 400 can utilize multiple radio frequency (RF) narrowband detectors for the uplink and downlink bands. For example, the bi-directional narrowband signal booster 400 can include a first narrowband detector 470 on an uplink path and a second narrowband detector 480 on a downlink path. The narrowband detector can look at smaller blocks or channels as compared to a broadband detector (as shown in FIG. 3). The narrowband detector can be a diode. Alternatively, the narrowband detector can be a log-detector integrated circuit (IC).

In one example, the bi-directional narrowband signal booster 400 can include an outside antenna 450 coupled to a first duplexer 410, and an inside antenna 460 coupled to a second duplexer 430. The bi-directional narrowband signal booster 400 can include a downlink path, which can include a series of amplifiers and downlink band pass filters. Similarly, the bi-directional narrowband signal booster 400 can include an uplink path, which can include a series of amplifiers and uplink band pass filters. In addition, the bi-directional narrowband signal booster 400 can include a controller 420 that is coupled to the narrowband detectors 470, 480 in the uplink and downlink paths, respectively.

In one configuration, a narrowband detector (e.g., the narrowband detector 470 or narrowband detector 480) can sweep (or scan) a passband. The narrowband detector can be positioned after a bandpass filter (BPF) in a signal chain. The BPF can have a defined passband, which can be measured in megahertz (MHz). For example, a band 25 (B25) uplink passband is 1850-1915 MHz and a band 25 (B25) downlink passband is 1930-1995 MHz. Signals on frequencies within that passband can pass through while signals on frequencies outside of that passband can be attenuated.

The narrowband detector can sweep the passband, and then store detected power levels. The narrowband detector can store one or more samples for each sub-band in the passband. For example, the narrowband detector can sample in accordance with a defined granularity, and the granularity of the sampling can vary (e.g., samples can be obtained every 1 MHz or every 100 KHz of the passband) depending on certain conditions. The granularity of the sampling can affect the amount of time taken to sweep the passband. As the narrowband detector sweeps (or scans) the passband, a signal power level can be detected and stored at each sampled frequency in the passband.

In one example, a bandwidth of the sub-bands can be variable, and the bandwidth of the sub-bands can be adjusted based on conditions and requirements. The bandwidth of the sub-bands can be less than an entire passband. As an example, the bandwidth of the sub-bands can range from 100 kilohertz (kHz) or less up to 20 megahertz (MHz) or more.

After the narrowband detector sweeps the passband, a signal booster gain can be adjusted. The adjustment of the signal booster gain can cause a change in a feedback path. The signal booster can be increased or decreased depending on certain testing conditions. For example, an increase to the signal booster gain may cause the signal booster to become closer to oscillating, whereas a decrease to the signal booster gain can cause the signal booster to be further away from oscillating. Regardless of whether the signal booster gain is increased or decreased, the adjustment of the signal booster gain can cause a change in the feedback path.

In one example, after the signal booster gain is adjusted, the narrowband detector can sweep (or scan) the passband again (i.e., for a second time) and store detected power levels. Similar to the first sweep of the passband, the narrowband detector can store one or more samples for each sub-band in the passband. The narrowband detector can sample the passband again in accordance with a defined granularity. When multiple samples are obtained for a particular sub-band, an average power level can be calculated and associated with that sub-band.

In other words, the narrowband detector can sweep the passband for a first time, and obtain a first set of detected power levels. The gain of the signal booster can be adjusted (e.g., increased or decreased) after the narrowband detector sweeps the passband for the first time. After the gain is adjusted, the narrowband detector can sweep the passband for a second time, and obtain a second set of detected power levels.

In one configuration, the first set of detected power levels can be compared with the second set of detected power levels. When the first set of detected power levels and the second set of detected power levels are within a defined threshold (i.e., the first and second set of detected power levels are relatively similar), then a determination can be made that the signal booster is not approaching an oscillation. On the other hand, when the first set of detected power levels and the second set of detected power levels are not within the defined threshold (i.e., the first and second set of detected power levels are relatively different), then a determination can be made that the signal booster is approaching an oscillation. The difference between the first and second set of detected power levels (beyond the defined threshold) can be due to noise floor increases, which can indicate that the signal booster is approaching an oscillation state. Therefore, by comparing the first and second set of detected power levels, magnitude changes between the power levels can be determined, and these magnitude changes (e.g., relatively small changes or relatively large changes in relation to the defined threshold) can be indicative of noise floor increases or decreases, which can indicate whether the signal booster is approaching an oscillation or not approaching an oscillation.

In one configuration, the signal booster can be calibrated during production (e.g., in the factory), and a base power level of the signal booster can be determined during the calibration process. This base power level can correspond to when the signal booster is not oscillating. In other words, the base power level can be a predetermined power level that corresponds to when the signal booster is not oscillating. After the signal booster is installed in the field, a narrowband detector can sweep (or scan) a passband, and obtain a set of detected power levels. The set of detected power levels can be compared with the base power level. Based on the comparison, a determination can be made as to whether the signal booster is approaching an oscillation. For example, when the set of detected power levels and the base power level are within the defined threshold, then a determination can be made that the signal booster is not approaching an oscillation. When the set of detected power levels and the base power level are not within the defined threshold, then a determination can be made that the signal booster is approaching an oscillation.

In one example, whether the signal booster is approaching an oscillation (as indicated by a noise floor increase) can be determined without actually instigating an oscillation. When an approaching oscillation is detected, certain actions can be performed (e.g., a gain can be reduced). The reduction of the gain can function to mitigate the approaching oscillation (i.e., prevents the oscillation from occurring). When no approaching oscillation is detected, certain actions can be performed (e.g., a gain can be increased or a gain level can be maintained).

In one configuration, peak to valley noise differentials can be calculated with respect to noise floor increases. The noise floor is a measure of the signal created from a sum of noise sources and unwanted signals (e.g., thermal noise). As the signal booster starts to approach an oscillation, the noise floor can increase in certain frequencies and cause a ripple effect. The noise floor can include peaks and valleys, and the peaks can be repetitive. The peak to valley noise differential can be between a peak and a valley immediately next to the peak. When the peak to valley noise differential is above a defined threshold, this can indicate that the signal booster is close to an oscillation. By adding path loss between antennas or increasing a distance between the antennas, the peak can drop, thereby causing the peak to valley noise differential to decrease. When the peak to valley noise differential to decreases, the signal booster moves further away from an oscillation.

For example, in the FCC Consumer Booster Standard, a 12 dB peak to valley differential can be permitted, which approximates to about a 5 dB oscillation margin (or a 5 dB gain or path loss adjustment in the signal booster). If the peak to valley differential is greater than 12 dB, then the signal booster can be too close to an oscillation. If the peak to valley differential is less than 12 dB, there is a sufficient oscillation margin and the signal booster can continue to operate at a certain gain. In one example, based on desired performance metrics, the signal booster can operate with an 8 dB peak to valley differential (or even 1 dB for a high performance product). Thus, the dB value can depend on a desired performance for the product.

In one configuration, the narrowband detector can sweep the passband and obtain a set of detected power levels, and noise peaks can be detected. The noise peaks can appear in regular intervals relative to the passband frequency. Based on various characteristics of the noise peaks (e.g., a number of noise peaks, a magnitude of the noise peaks, a frequency delta between noise peaks), an approaching oscillation can be detected. In one example, each band can have a regular frequency delta characteristic, which can relate to a number of known noise peaks in the passband. When there are other noise peaks with irregular frequency deltas, then a determination can be made that the signal booster is approaching an oscillation.

In addition, the narrowband detector can sweep the passband in accordance with a sampling rate that is selected based on the frequency delta of the noise peaks. As an example, when the number of peaks that have a frequency delta is known and a value of the frequency delta is known, then the sampling can occur at a selected rate to avoid aliasing. For example, when a noise peak occurs every 2 MHz when an oscillation is approaching, the sampling can occur every 1 MHz. On the other hand, if the frequency delta is every 100 KHz, then the rate of sampling can be reduced.

In another example, an oscillation can be characterized on a particular signal booster (e.g., to determine what an oscillation looks like for that particular signal booster). Therefore, when a peak to valley differential corresponds to a peak to valley differential that is known to indicate that an oscillation is approaching, a determination can be made that the signal booster is approaching an oscillation. However, when the peak to valley differential does not correspond to a peak to valley differential that is known to indicate that an oscillation is approaching, a determination can be made that the signal booster is not approaching an oscillation.

In one configuration, modulation identification discrimination algorithms can be applied to each narrowband sample, which can function to discriminate between different types of signals. As a result, a peak can be identified as being related to an oscillation, or on the other hand, a peak can be identified as being related to an actual signal.

In one example, the narrowband detection can add complexity and cost to the booster. However, the narrowband detector can be applicable for high-performance broadband boosters, and this market category can be less sensitive to price and demands improved performance.

In one example, the narrowband detection can be implemented in a variety of manners. For example, an on-board spectrum analyzer integrated circuit (IC) can be used. One manner can use a mixer, synthesizer, and an intermediate frequency (IF) filter. Similarly, the narrowband detection can be performed using digital techniques, which can replace the IF filter with an analog to digital converter (ADC) and processor. Digital techniques can improve speed since a sweeping of the band can be avoided, but digital techniques can increase cost. In addition, the narrowband detector could include an internal BPF function. In other words, the narrowband detector does not necessarily have to follow a BPF in a signal chain (as shown in FIG. 4).

In one example, a multiplex detector can be used to reduce cost, as narrowband detection can be expensive. In one example, isolation can be increased by adding single pole single throw (SPST) switches or single pole double throw (SPDT) switches to each signal path.

In one example, the same narrowband detector can be used for both UL and DL. In another example, a first narrowband detector can be used for only the UL path and a second narrowband detector can be used for only the DL path, which can overcome isolation concerns. In yet another example, a diode can be used rather than a log-detector for narrowband detection. In a further example, signal pick-up (tapping) options include directional couplers, resistors, splitters, capacitors, etc. In yet a further example, the same log-detector can be used for narrowband and broadband detection.

Figure 5:
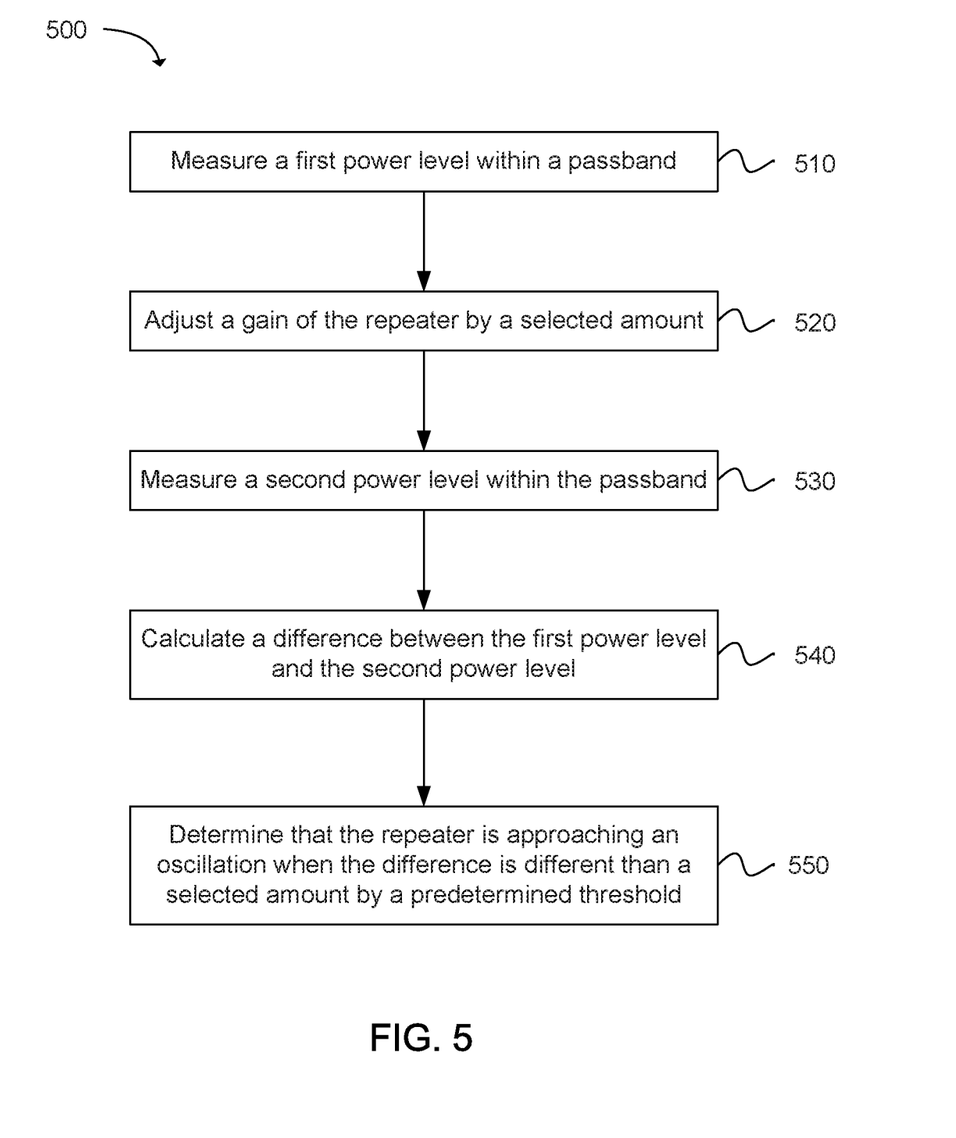
FIG. 5 illustrates functionality of a repeater in accordance with an example.

FIG. 5 illustrates an example of functionality of a repeater. The repeater can include one or more processors and memory configured to measure a first power level within a passband, as in block 510. The repeater can include one or more processors and memory configured to adjust a gain of the repeater by a selected amount, as in block 520. The repeater can include one or more processors and memory configured to measure a second power level within the passband, as in block 530. The repeater can include one or more processors and memory configured to calculate a difference between the first power level and the second power level, as in block 540. The repeater can include one or more processors and memory configured to determine that the repeater is approaching an oscillation when the difference is different than a selected amount by a predetermined threshold, as in block 550.

Figure 6:
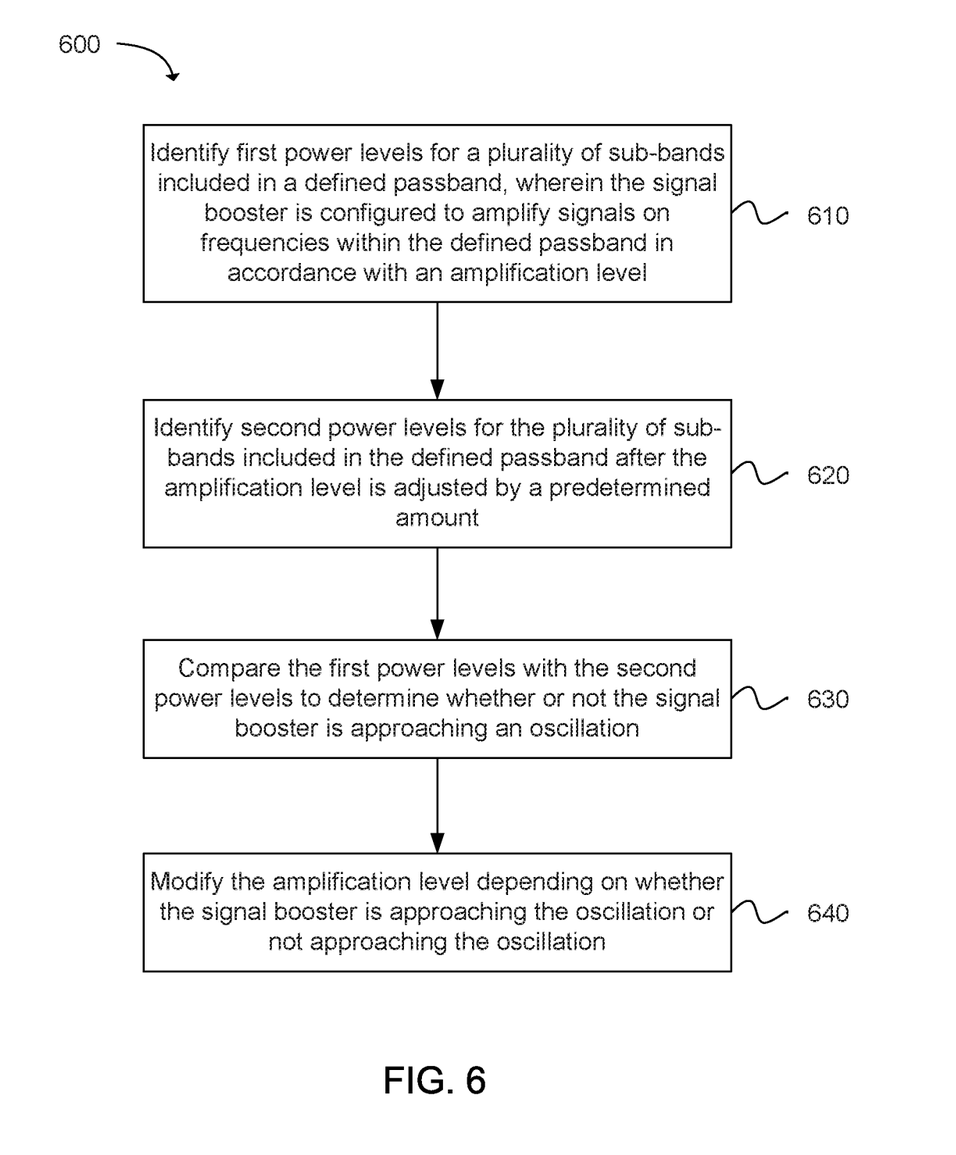
FIG. 6 illustrates functionality of a signal booster in accordance with an example.

FIG. 6 illustrates an example of functionality of a signal booster. The signal booster can include one or more processors and memory configured to identify first power levels for a plurality of sub-bands included in a defined passband, wherein the signal booster is configured to amplify signals on frequencies within the defined passband in accordance with an amplification level, as in block 610. The signal booster can include one or more processors and memory configured to identify second power levels for the plurality of sub-bands included in the defined passband after the amplification level is adjusted by a predetermined amount, as in block 620. The signal booster can include one or more processors and memory configured to compare the first power levels with the second power levels to determine whether or not the signal booster is approaching an oscillation, as in block 630. The signal booster can include one or more processors and memory configured to modify the amplification level depending on whether the signal booster is approaching the oscillation or not approaching the oscillation, as in block 640.

Figure 7:
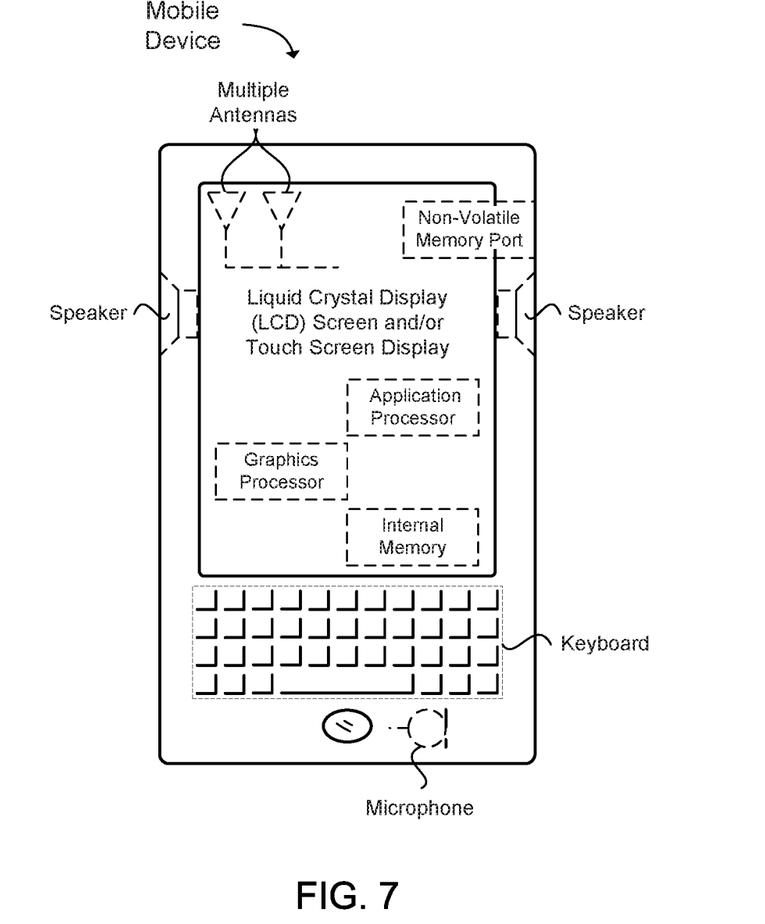
FIG. 7 illustrates a wireless device in accordance with an example.

FIG. 7 provides an example illustration of the wireless device, such as a user equipment (UE), a mobile station (MS), a mobile communication device, a tablet, a handset, a wireless transceiver coupled to a processor, or other type of wireless device. The wireless device can include one or more antennas configured to communicate with a node or transmission station, such as an access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 7 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes a repeater, comprising one or more processors and memory configured to: measure a first power level within a passband; adjust a gain of the repeater by a selected amount; measure a second power level within the passband; calculate a difference between the first power level and the second power level; and determine that the repeater is approaching an oscillation when the difference is different than a selected amount by a predetermined threshold.

Example 2 includes the repeater of Example 1, wherein the one or more processors and memory are further configured to measure the first power level and the second power level across the entire passband.

Example 3 includes the repeater of any of Examples 1 to 2, wherein the one or more processors and memory are further configured to: measure the first power level as a plurality of narrowband power level measurements at selected frequencies across the passband to determine a plurality of first power levels; measure the second power level as a plurality of narrowband power level measurements at the selected frequencies across the passband to determine a plurality of second power levels; calculate a difference between each of the plurality of first power levels and the plurality of second power levels to determine a plurality of power level differences; and determine that the repeater is approaching the oscillation when one or more of the plurality of power level differences is greater than the selected amount by the predetermined threshold.

Example 4 includes the repeater of any of Examples 1 to 3, wherein the narrowband power level measurements are performed by sweeping the passband using a narrowband detector.

Example 5 includes the repeater of any of Examples 1 to 2, wherein the determination that the repeater is approaching the oscillation occurs when one or more of the plurality of power level differences occurs at a frequency that is not a signal frequency within the passband.

Example 6 includes a signal booster, comprising one or more processors and memory configured to: identify first power levels for a plurality of sub-bands included in a defined passband, wherein the signal booster is configured to amplify signals on frequencies within the defined passband in accordance with an amplification level; identify second power levels for the plurality of sub-bands included in the defined passband after the amplification level is adjusted by a predetermined amount; compare the first power levels with the second power levels to determine whether or not the signal booster is approaching an oscillation; and modify the amplification level depending on whether the signal booster is approaching the oscillation or not approaching the oscillation.

Example 7 includes the signal booster of claim 6, further comprising a narrowband detector configured to detect the first power levels and the second power levels for the plurality of sub-bands included in the defined passband.

Example 8 includes the signal booster of any of Examples 6 to 7, wherein the one or more processors and memory are configured to: determine that the signal booster is approaching the oscillation when the first power levels and the second power levels are separated by greater than a defined value; and decrease the amplification level when the signal booster is approaching the oscillation.

Example 9 includes the signal booster of any of Examples 6 to 8, wherein the one or more processors and memory are configured to: determine that the signal booster is not approaching the oscillation when the first power levels and the second power levels are separated by less than a defined value; and increase the amplification level when the signal booster is not approaching the oscillation; or maintain a current amplification level when the signal booster is not approaching the oscillation.

Example 10 includes the signal booster of any of Examples 6 to 9, wherein the one or more processors and memory are configured to: decrease the amplification level when the signal booster is approaching the oscillation; determine that the signal booster is no longer approaching the oscillation after a defined period of time; and increase the amplification level to a previous amplification level.

Example 11 includes the signal booster of any of Examples 6 to 10, wherein the one or more processors and memory are configured to: identify peak to valley differentials for power level measurements obtained at the signal booster; and determine that the signal booster is approaching the oscillation when the peak to valley differentials exceed a defined threshold.

Example 12 includes the signal booster of any of Examples 6 to 11, wherein the one or more processors and memory are configured to: identify peak to valley differentials for power level measurements obtained at the signal booster; and determine that the signal booster is approaching the oscillation when the peak to valley differentials correspond to known peak to valley differentials that indicate an approaching oscillation.

Example 13 includes the signal booster of any of Examples 6 to 12, wherein the one or more processors and memory are configured to: determine that the signal booster is approaching the oscillation when frequencies of power level measurements are periodic, wherein a periodicity of the power level measurements is based on a passband frequency.

Example 14 includes the signal booster of any of Examples 6 to 13, wherein the oscillation is created when a first antenna of the signal booster is within a defined distance of a second antenna of the signal booster.

Example 15 includes the signal booster of any of Examples 6 to 14, wherein the one or more processors and memory are configured to: modify the amplification level prior to the oscillation being created at the signal booster, wherein the amplification level is modified to prevent an occurrence of the oscillation at the signal booster.

Example 16 includes the signal booster of any of Examples 6 to 15, wherein each of the plurality of sub-bands can range from 100 kilohertz (KHz) to 2 megahertz (MHz).

Example 17 includes a signal booster, comprising: a narrowband detector operable to detect power levels for a plurality of sub-bands included in a defined passband, wherein the signal booster is configured to amplify signals on frequencies within the defined passband in accordance with an amplification level; and a controller configured to: compare the detected power levels with baseline power levels to determine whether or not the signal booster is approaching an oscillation; and modify the amplification level depending on whether the signal booster is approaching the oscillation or not approaching the oscillation.

Example 18 includes the signal booster of Example 17, wherein the controller is configured to: determine that the signal booster is approaching the oscillation when the detected power levels and the baseline power levels are separated by greater than a defined value; and decrease the amplification level when the signal booster is approaching the oscillation.

Example 19 includes the signal booster of any of Examples 17 to 18, wherein the controller is configured to: determine that the signal booster is not approaching the oscillation when the detected power levels and the baseline power levels are separated by less than a defined value; and increase the amplification level when the signal booster is not approaching the oscillation.

Example 20 includes the signal booster of any of Examples 17 to 19, wherein the controller is configured to: identify peak to valley differentials for a noise floor of the signal booster over a defined period of time; and determine that the signal booster is approaching the oscillation when the peak to valley differentials exceed a defined threshold.

Example 21 includes the signal booster of any of Examples 17 to 20, wherein the controller is configured to: identify peak to valley differentials for a noise floor of the signal booster over a defined period of time; and determine that the signal booster is approaching the oscillation when the peak to valley differentials correspond to known peak to valley differentials that indicate an approaching oscillation.

Example 22 includes the signal booster of any of Examples 17 to 21, wherein the controller is configured to determine that the signal booster is approaching the oscillation when frequencies of power level measurements are periodic, wherein a periodicity of the power level measurements is based on a passband frequency.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be incorporated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A repeater, comprising one or more processors and memory configured to:
    identify first power levels for a plurality of sub-bands included in a defined passband, wherein the repeater is configured to amplify signals on frequencies within the defined passband in accordance with an amplification level;
    identify second power levels for the plurality of sub-bands included in the defined passband after the amplification level is adjusted by a predetermined amount;

compare the first power levels with the second power levels to determine whether or not the repeater is approaching an oscillation; and modify the amplification level depending on whether the repeater is approaching the oscillation or not approaching the oscillation.

2. The repeater of claim 1, further comprising a narrowband detector configured to detect the first power levels and the second power levels for the plurality of sub-bands included in the defined passband.

3. The repeater of claim 1, wherein the one or more processors and memory are configured to:

determine that the repeater is approaching the oscillation when the first power levels and the second power levels are separated by greater than a defined value; and decrease the amplification level when the repeater is approaching the oscillation.

4. The repeater of claim 1, wherein the one or more processors and memory are configured to:

determine that the repeater is not approaching the oscillation when the first power levels and the second power levels are separated by less than a defined value; and increase the amplification level when the repeater is not approaching the oscillation; or maintain a current amplification level when the repeater is not approaching the oscillation.

5. The repeater of claim 1, wherein the one or more processors and memory are configured to:

decrease the amplification level when the repeater is approaching the oscillation;

determine that the repeater is no longer approaching the oscillation after a defined period of time; and increase the amplification level to a previous amplification level.

6. The repeater of claim 1, wherein the one or more processors and memory are configured to:

identify peak to valley differentials for power level measurements obtained at the repeater; and determine that the repeater is approaching the oscillation when the peak to valley differentials exceed a defined threshold.

7. The repeater of claim 1, wherein the one or more processors and memory are configured to:

identify peak to valley differentials for power level measurements obtained at the repeater; and determine that the repeater is approaching the oscillation when the peak to valley differentials correspond to known peak to valley differentials that indicate an approaching oscillation.

8. The repeater of claim 1, wherein the one or more processors and memory are configured to: determine that the repeater is approaching the oscillation when frequencies of power level measurements are periodic, wherein a periodicity of the power level measurements is based on a passband frequency.

9. The repeater of claim 1, wherein the oscillation is created when a first antenna of the repeater is within a defined distance of a second antenna of the repeater.

10. The repeater of claim 1, wherein the one or more processors and memory are configured to: modify the amplification level prior to the oscillation being created at the repeater, wherein the amplification level is modified to prevent an occurrence of the oscillation at the repeater.

11. The repeater of claim 1, wherein each of the plurality of sub-bands can range from 100 kilohertz (KHz) to 2 megahertz (MHz).

12. A repeater, comprising:

a narrowband detector operable to detect power levels for a plurality of sub-bands included in a defined passband, wherein the repeater is configured to amplify signals on frequencies within the defined passband in accordance with an amplification level; and a controller configured to:

compare the detected power levels with baseline power levels to determine whether or not the repeater is approaching an oscillation; and modify the amplification level depending on whether the repeater is approaching the oscillation or not approaching the oscillation.

13. The repeater of claim 12, wherein the controller is configured to:

determine that the repeater is approaching the oscillation when the detected power levels and the baseline power levels are separated by greater than a defined value; and decrease the amplification level when the repeater is approaching the oscillation.

14. The repeater of claim 12, wherein the controller is configured to:

determine that the repeater is not approaching the oscillation when the detected power levels and the baseline power levels are separated by less than a defined value; and increase the amplification level when the repeater is not approaching the oscillation.

15. The repeater of claim 12, wherein the controller is configured to:

identify peak to valley differentials for a noise floor of the repeater over a defined period of time; and determine that the repeater is approaching the oscillation when the peak to valley differentials exceed a defined threshold.

16. The repeater of claim 12, wherein the controller is configured to:

identify peak to valley differentials for a noise floor of the repeater over a defined period of time; and determine that the repeater is approaching the oscillation when the peak to valley differentials correspond to known peak to valley differentials that indicate an approaching oscillation.

17. The repeater of claim 12, wherein the controller is configured to determine that the repeater is approaching the oscillation when frequencies of power level measurements are periodic, wherein a periodicity of the power level measurements is based on a passband frequency.

* * * * *